United States Patent [19]
Hofstetter et al.

[11] Patent Number: 5,932,934
[45] Date of Patent: Aug. 3, 1999

[54] CIRCUIT FOR THE INFINITE DIRECT OR INDIRECT VARIATION OF THE DIRECT AND/OR ALTERNATING CURRENT FLOWING THROUGH A LOAD OPERATED BY A MAINS DC OR AC VOLTAGE OR AN ARBITRARY COMBINATION THEREOF

[75] Inventors: Peter Hofstetter, Herbolzheim-Wagenstadt; Thomas Schneider, Emmendingen, both of Germany

[73] Assignee: Ascom Frako GmbH, Teningen, Germany

[21] Appl. No.: 09/041,816

[22] Filed: Mar. 12, 1998

[30] Foreign Application Priority Data

Mar. 12, 1997 [DE] Germany .......................... 197 10 161
Sep. 22, 1997 [DE] Germany .......................... 197 41 655

[51] Int. Cl.$^6$ ....................................................... H02J 3/02
[52] U.S. Cl. ............................................................ 307/26
[58] Field of Search ................................ 307/26, 27, 28; 363/36, 37, 39

[56] References Cited

U.S. PATENT DOCUMENTS 5,631,814  5/1997  Zak ........................................... 363/37

FOREIGN PATENT DOCUMENTS 35 09 451  9/1986  Germany .
44 28 682  1/1997  Germany .

*Primary Examiner*—Shawn Riley
*Attorney, Agent, or Firm*—Hill & Simpson

[57] ABSTRACT

A circuit for continuously directly or indirectly varying a combination of direct and alternating current flowing through a load supplied with a combination of direct and alternating voltage from a public utility mains, has a low-pass filter that serves for achieving a continuously flowing input current $I_{in}$, a coil that is connected in series with the load or is inherently contained in the load, a first alternating current switch that is connected parallel to the load and to the coil, a second alternating current switch connected in series with the load that can be driven with a higher switching frequency compared to the network frequency $f_{network}$, and a regulator for the direct or indirect regulation of the direct and/or alternating current $I_{load}$ flowing through the load. The regulator has an acquisition part for the direct and/or indirect acquisition of the actual direct and/or alternating current $I_{load,actual}$ flowing through the load, a reference value input part for the direct or indirect input of the reference value of the direct and/or alternating current $I_{load,ref}$ flowing through the load, and a drive part that switches the second alternating current switch on and off with a switching frequency suitable for generating the reference direct and/or alternating current $I_{load,ref}$ and with a suitable pulse-duty ratio τ. A combination of a direct and an indirect acquisition leads to an acquisition of the power $P_{load}$.

32 Claims, 8 Drawing Sheets

CIRCUIT FOR THE INFINITE DIRECT OR INDIRECT VARIATION OF THE DIRECT AND/OR ALTERNATING CURRENT FLOWING THROUGH A LOAD OPERATED BY A MAINS DC OR AC VOLTAGE OR AN ARBITRARY COMBINATION THEREOF

BACKGROUND OF THE INVENTION

1. Field of the Invention

The present invention is directed to a circuit for the continuous direct or indirect variation of the direct and/or alternating current flowing through a load operated by a mains DC or AC voltage or an arbitrary combination thereof, of the type having a network that makes an input voltage $U_{in}$ having an arbitrary shape and frequency $f_{network}$ available, and with the load being connected to the network via the circuit.

2. Description of the Prior Art

Such loads or loads can, for example, be heating elements formed by ohmic resistors or heating tubes and that exhibit a more or less linear curve of the temperature-resistance characteristic curve. The circuit is also employable for loads having an inductive characteristic such as, for example, motors, transformers or filter circuits capacitive loads such as electrical or electronic circuits or capacitive circuits of other load types as well as filter circuits having capacitive characteristics can likewise be utilized. The loads or loads can have portions composed of different ones of these load types.

Various methods are utilized for regulating the power output to electrical or electronic loads. The goal of these methods is to vary the power supplies to a load or a load in arbitrarily fine steps in a range between 0 and 100% of the nominal power.

The phase controller utilized in alternating current networks represents such a method. In a phase controller, the two half-waves of the mains (public utility) voltage are partially blanked and the power effectively supplied to the load is thus effectively reduced. The power output to the load can be varied between 0 and 100% of the nominal power with the phase controller by varying the phase angle. A disadvantage of this method is that the mains voltage and the mains current differ in terms of their form, i.e. the mains current contains harmonics not present in the mains voltage. These harmonics can negatively influence other loads and lead to considerable problems in the network. These harmonics can be reduced by employing extremely large filters, but this leads to wattless currents and reduction of the effective parts.

Another such method is full-wave or half-wave packet control, that is employed in alternating current networks. In this method, a number of mains full-waves or half-waves are blanked. This means that the load is periodically connected to and disconnected from the network. The power supplies on average to the load is varied in the range between 0 and 100% of nominal power by modifying the on duration. This method has the disadvantage that the load periodically loads the network. Given a non-linear load, this effect is additionally intensified by the increased start current. The periodic network loading generates fluctuations of the mains voltage due to the network impedance which has a disturbing effect, for example in the form of flickering given illumination devices.

Both of the above-described methods for regulating the power supplied to a load can no longer be employed in public networks, or can only be employed therein with additional outlay, to which standards for limiting harmonics (EN61000-3-2 or EN61000-3-4) and for limiting flickering (EN61000-3-3) apply. According to the current status of the discussions in the appertaining European committees, these standards will take effect on Jan. 1, 2001.

SUMMARY OF THE INVENTION

An object of the present invention is to provide a circuit of the type initially described wherein harmonics and flickering in the network are avoided.

This object is inventively achieved in a circuit for continuously directly or indirectly varying a combination of direct and alternating current flowing through a load supplied with a combination of direct and alternating voltage from a public utility mains, the circuit having a low-pass filter that serves for achieving a continuously flowing input current $I_{in}$, a coil that is connected in series with the load or is inherently contained in the load, a first alternating current switch that is connected parallel to the load and to the coil, a second alternating current switch connected in series with the load that can be driven with a higher switching frequency compared to the network frequency $f_{network}$, and a regulator for the direct or indirect regulation of the direct and/or alternating current $I_{load}$ flowing through the load. The regulator has an acquisition part for the direct and/or indirect acquisition of the actual direct and/or alternating current $I_{load,actual}$ flowing through the load, a reference value input part for the direct or indirect input of the reference value of the direct and/or alternating current $I_{load,ref}$ flowing through the load, and a drive part that switches the second alternating current switch on and off with a switching frequency suitable for generating the reference direct and/or alternating current $I_{load,ref}$ and with a suitable pulse-duty ratio $\tau$. A combination of a direct and an indirect acquisition leads to an acquisition of the power $P_{load}$.

As used herein, the phrase "a combination of direct and alternating current" means any combination of direct and/or alternating current, including 100% direct current and/or 100% alternating current and all relative percentages in between. As used herein, the phrase "combination of direct and alternative voltage" means any combination of direct and/or alternating voltage, including 100% direct voltage and/or 100% alternating voltage, and all percentages in between.

In an embodiment of the invention the circuit has a first and/or a second alternating current switch, in the form of two driveable semiconductor switches respectively connected parallel to the load and the coil in combination with respective series-connected diodes, whereby the semiconductor switch/diode combinations are connected with opposite polarity relative to one another.

Further, the circuit can have a first and/or a second alternating current switch in the form of two semiconductor switches connected oppositely in series and, each semiconductor switch possibly having an inverse diode integrated therein, or an inverse diode separately connected parallel thereto, or a semiconductor component connected parallel thereto and having an integrated inverse diode.

By employing semiconductor switches that are connected in series and opposite one another, lower on-state voltages and thus low on-state losses and a higher efficiency are achieved. Moreover, semiconductor switches with respective integrated inverse diode enable a single current path having a lower number of components, since the inverse diodes are integrated on a semiconductor switch chip. The employment of semiconductor switches represents a simple solution that enables a simplification of the drive of the semiconductor switches, a simplification of the auxiliary voltage generation for driving the semiconductor switches and the reduction of the component outlay in the drive circuit. Alternatively, semiconductor switches having a separate inverse diode enable a better matching of the switch components and the inverse diode, in view of the on-state voltage and switching speed, to the switching job at hand. A switch component having an integrated inverse diode, for example a MOSFET, namely, can only offer a poor compromise given some applications.

In another embodiment of the invention the circuit includes a drive and synchronization stage for driving and for switching of the direction of current allowed in the first alternating current switch that is connected parallel to the input voltage $U_{in}$ at the network side for acquiring the polarity of the input voltage. The switching is synchronized with the polarity or the zero-axis crossing of the input voltage $U_{in}$. This stage includes the first alternating current switch driven by at least one current source via at least one drive opto-coupler.

In another embodiment first and second alternating current switches are provided that can be driven inversely relatively to one another, asynchronously relative to the network.

At least one further low-pass filter can be provided. For example, low-pass filters can be provided respectively at the input and at the output. The employment of an input low-pass filter causes the input current, the input voltage as well as the output current and output voltage always to remain identical in form and frequency (no harmonics, no flickering). As a result of the pulsing of the input current, a low-pass filter is required at the network input in order to generate a continuously flowing network current. Moreover, this low-pass filter insures that the required degree of noise suppression is achieved. The structure and the complexity of the low-pass filter is based on the demands of the applicable EMC standards. A low-pass filter at the output can also be necessary according to these demands.

At least one low-pass filter can be a capacitor connected parallel to the network or a combination of at least one current-compensated or non-current-compensated coil and at least one capacitor, with at least one capacitor being a X-capacitor or at least one capacitor being a Y-capacitor. The combination may be of a multi-stage form. The combination depends on the power, on the switching frequency and on the required noise suppression.

At least one of the semiconductor switches is composed of at least one MOSFET transistor or at least one bipolar transistor or at least in IGBT or at least one GTO or at least one MCT or at least one thyristor or at least one triac.

Further, each current source can be a depletion mode MOSFET or an enhancement mode MOSFET, or a bipolar transistor or an IGBT. The depletion mode MOSFET already carries the current necessary for the drive opto-couplers, given extremely low mains voltage, i.e. shortly after the zero-axis crossing of the voltage, and thus enable a minimum dead time between the drive signals for the two direct current switches.

In another embodiment the drive opto-coupler or couplers directly drives/drive the first alternating current switch at the output side or drive/drives it indirectly via a driver or inverter unit.

The semiconductor components of the two alternating current switches can be arranged such that the reference potential is shared for the drive. Given employment of, for example, MOSFETs as alternating current switches, the two source electrodes are then connected to one another.

The current in the second alternating switch can be supplied to the regulator by a shunt or by a current converter. An electronic overload or short-circuit protection is thus realized and a current monitoring is produced that, as needed, intervenes in the regulation of the direct and/or alternating voltage $U_{load}$ across the load. Particularly at higher powers, a current converter has an advantage over a shunt due to lower losses.

The switching frequency of the second alternating current switch preferably lies in the range from 1 kHz through 500 kHz. Only the coil is directly dependent on the switching frequency of the second alternating current switch. Given a switch frequency which is too low, the coil becomes extremely large in mechanical terms. Given a frequency which is too high (small coil), high switch losses occur in the second alternating current switch.

The input part can be a potential-constrained or potential-free interface for programming the direct and/or alternating current $I_{load}$ flowing through the load and/or the direct and/or alternating voltage $U_{load}$ across the load in the range from 0% through 100% of the respective nominal values. The use of the inventive circuit as an actuator in a higher-ranking control circuit requires the possibility of being able to make the output quantity variable as the regulating variable. When, for example, the inventive circuit is utilized for supplying a temperature-regulated heating element, the temperature regulator must offer the possibility of transmitting a reference value to the converter. Dependent on the demands, the last-cited embodiment can also be potential-isolated with known methods such as, for example, opto-couplers, a repeater or isolating amplifiers. The type of data transmission, for example the data protocol, can be arbitrary in conformity with the technical standards such as, for example, a digital parallel or serial data transmission, PWM, frequency modulation, analog signals and all other known methods.

The load can be an ohmic load, particularly having a substantially linear behavior, or can be an inductive load, particularly a transformer or motor or inductive filter, or can be a capacitive load, particularly an electrical or electronic circuit or a capacitive circuit of loads or a capacitive filter or electrical or electronic loads, or an arbitrary combination thereof.

The invention is based on the surprising perception that, due to the employment of two alternating current switches with a suitable control thereof, the current accepted from a sinusoidal network by a load which is linear within certain limits exhibits a sinusoidal curve, i.e. no harmonics of the mains current are present in the network, and the current exhibits a continuous curve in every operating point. As a result, switching events that could lead to flickering are avoided.

The voltage made available at the load, or the current flowing through the load, can be programmed in the range between 0% and 100% of the input voltage or of the input current via a freely definable interface (for example, digital parallel, digital serial, PWM, analog, etc.). For example, a 1.2 kW circuit achieves an efficiency between 85% (small load with approximately 100 W) and 98% (largest load, with approximately 1200 W). An operation of the load with a DC voltage supply or with a combined DC and AC voltage supply is also possible, the aforementioned standards being followed at the mains side. An AC voltage operation of the load is necessary given specific load types (for example, infrared heating tubes) since a DC voltage operation (for example, on the basis of a material drift from one electrode to the other) can have a negative effect in the form of a shortening of the service life of this load type. Simplified, the circuit behaves like a loss-free, programmable alternating current resistor.

The circuit can be utilized for all mains-operated loads whose consumed power is to be varied in arbitrary steps between 0 and 100%. The circuit is particularly suited for all types of heating elements with an ohmic, partially non-linear characteristic such as, for example, heating lamps and resistors for industrial and other purposes, heating furnaces in general, hot plates, dimmers, alternating current controls, ballast devices and the like. The advantages are especially pronounced compared to operation of such a load with a type of two-point control (phase control, half-wave or full-wave packet control or the like) in order to generate a sub-load operation, which must now be adapted to the new standards. The circuit enables the transition (retrofit) from a previously connected two-point operation into a modern permanent operation with extremely high efficiency in every operating point. The demands of the standards EN61000-3-2, EN61000-3-3 and EN61000-3-4 are thereby met in an ideal way because a continuous sinusoidal flow of current is assured in any arbitrary operating point.

DESCRIPTION OF THE PREFERRED EMBODIMENTS

Figure 1:
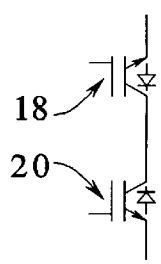
FIG. 1 shows an alternating current switch in the form of two IGBTs connected via their collectors, each having an integrated inverse diode according to an embodiment of the inventive circuit.

FIG. 1 shows an embodiment of the first alternating current switch 16 (also applicable to the second alternating current switch 32) of the inventive circuits. The first alternating current switch 16 is composed of two series-connected semiconductor switches 18 and 20 (and the second alternating current switch 32 is composed to two series-connected semiconductor switches 33 and 35) in the form of IGBTs, each with an integrated inverse diode. The two semiconductor switches 18, 20 (or 33, 35) are connected via their collectors. This type of interconnection of semiconductor switches results in, dependent on the direction of current, one semiconductor switch conducting in the transmitting direction whereas the other semiconductor switch simultaneously carries the current in the reverse direction via the internal inverse diode. By definition, the transmitting direction in MOSFETs corresponds to the direction of the current flowing from the drain to the source electrode, and the opposite direction corresponds to the reverse direction of current flow. The transmissively conducting semiconductor switch also takes over a switching function for this current direction.

Figure 2:
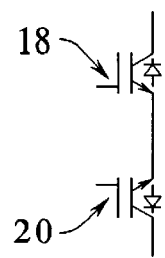
FIG. 2 shows an alternating current switch in the form of two IGBTs connected via their emitters according to a further embodiment of the inventive circuit.

FIG. 2 shows a further embodiment of the first (and second) alternating current switches composed of two semiconductor switches 18, 20 (or 33, 35) in the form of two series-arranged IGBTs, each with an integrated inverse diode, that are connected to one another via their emitters.

Figure 3:
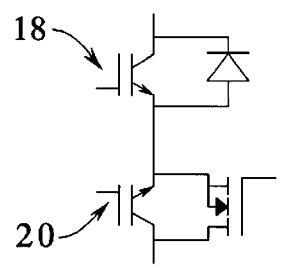
FIG. 3 shows an alternating current switch in the form of two IGBTs with respective inverse diodes connected in parallel therewith, according to a further embodiment of the inventive circuit.

FIG. 3 shows a further embodiment of the first and second alternating current switches composed of two semiconductor switches 18, 20 (or 33, 35) in the form of two series-connected IGBTs without integrated inverse diodes. The two IGBTs are connected to one another via their emitters. A separate diode is connected parallel to the upper IGBT, this carrying the reverse current for the IGBT. A MOSFET is connected in parallel with the lower IGBT. The inverse diode contained in the MOSFET carries the reverse current for the lower IGBT. A parallel circuit of components each with an inverse diode and components without an inverse diode can also be used. Given such a combination, the component with the inverse diode would carry the reverse current by itself, whereas the transmitting current is divided by both components. For example, the power to be switched can be increased as a result of such parallel circuitry.

Figure 4:
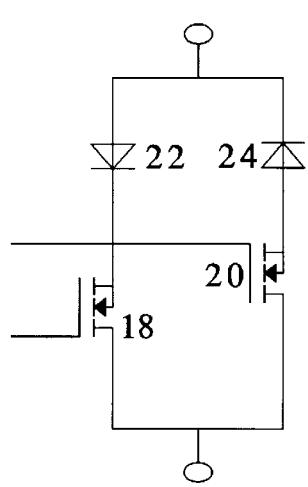
FIG. 4 shows an alternating current switch in the form of two current paths of opposite polarity that respectively contain a MOSFET and a blocking diode.

FIG. 4 shows a further embodiment of a first (and second) alternating current switch constructed in the form of two current paths of opposite polarity. Each current direction has its own current path. MOSFETs 18, 20 (or 33, 35) are employed as switches and a diode 22 (or 24) is connected in series for protection against opposite polarity voltages. Given extremely high alternating currents, this combination can yield the advantage that each path carries current only for a half-wave and the average losses and the heating of this path can thus be reduced.

Figure 5:
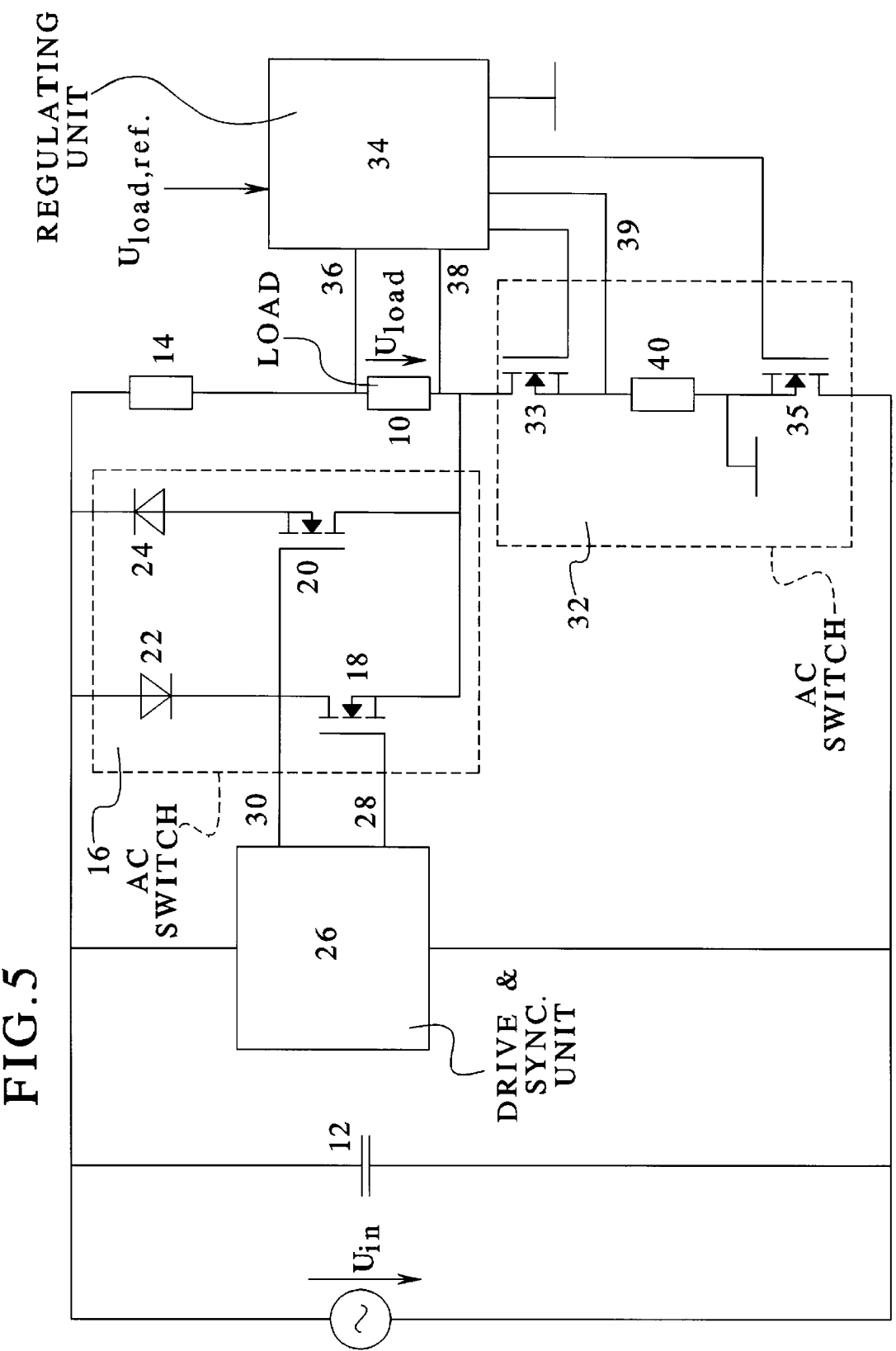
FIG. 5 is a schematic of the inventive circuit that has a voltage regulator and a first alternating current switch in the form of two semiconductor switches connected with opposite polarity.

FIG. 5 shows a load (load) 10 operated from a mains with an input alternating voltage $U_{in}$ having a network frequency $f_{network}$ (50 Hz). Further, a low-pass filter 12 in the form of a capacitor is connected parallel to the network and a coil 14 is connected in series with the load 10. The voltage $U_{load}$ across the load 10 can be infinitely varied in the range from 0 through 100% of the input alternating voltage $U_{in}$ by the inventive circuit. The circuit has a first alternating current switch 16, a second alternating current switch 32 that can be driven with a higher switching frequency compared to the network frequency $f_{network}$, a drive and synchronization unit 26 and a regulator 34 for the regulation of the alternating voltage $U_{load}$ across the load 10.

The first alternating current switch 16 is formed by two driveable semiconductor switches 18 and 20 respectively connected in parallel with the load 10 and the coil 14, that are respectively supplemented by a series-connected diodes 22 and 24 as protection against opposite polarity voltages. The semiconductor switch/diode combinations 18 and 22, and 20 and 24, are arranged with opposite polarity relative to one another. Via the second alternating current switch 32, the circuit is operated in both current directions at the alternating voltage network. The drive and synchronization unit 26 serves for the drive of the semiconductor switches 18 and 20 and for the switching of the semiconductor switches 18 and 20 in mutually opposite switch conditions, synchronously with the polarity of the input voltage $U_{in}$. The drive synchronization unit 26 is connected parallel to the input voltage $U_{in}$ at the network side for the acquisition of the polarity of the input voltage $U_{in}$, and has two drive lines 28, 30 that are respectively connected to the semiconductor switches 18 and 20 for the drive thereof.

The second alternating switch 32 is connected in series with the load 10. The coil 14 is magnetized in both current directions via the second alternating current switch 32. Depending on the polarity of the input alternating voltage $U_{in}$, the corresponding semiconductor switch 18 or 20 is activated so that the coil 14 can demagnetize via the load 10 when the second alternating current switch 32 is turned off. The semiconductor switch 18 is turned on during the negative network half-wave (also see FIG. 6), and the semiconductor switch 20 is turned off during the positive network half-wave (all see FIG. 6). This means that the semiconductor switches 18 and 20 are switched exactly synchronized with the polarity of the input alternating voltage $U_{in}$.

The regulating unit 34 has a voltage acquisition part for acquiring the actual alternating voltage $U_{load,actual}$ across the load 10 that is connected parallel to the user 10 via two lines 36, 38, a voltage reference value input part for supplying the reference value of the alternating voltage $U_{load,actual}$ across the load 10, and comprises a drive part that switches the second alternating current switch 32 on and off with a switching frequency suitable for generating the rated alternating voltage $U_{load, ref.}$ and with a suitable pulse-duty ratio τ (on-duration/cycle duration). To that end, the pulse-duty ratio τ is varied given a constant switching frequency.

With a shunt 40 or a suitable current converter, the current through the second alternating current switch 32 is acquired and proportionally supplied to the regulating unit 34 via the line 39.

In a stationary operating point wherein the alternating voltage at the load 10 amounts to $0<U_{load}<U_{in}$, the second alternating current switch 32 is switched on and off with a fixed switching frequency. For a rise of the voltage $U_{load}$ the pulse-duty ratio τ (on-duration/cycle duration) is increased until the second alternating current switch 32 remains permanently turned on at a maximum voltage of $U_{load}$ equals $U_{in}$. In order to lower the voltage $U_{load}$, the pulse-duty ratio τ is reduced to the value 0, at which $U_{load}=0$ (second alternating current switch 32 is turned off). The switching frequency for the second alternating current switch 32 need not be coupled to the network frequency $f_{network}$ and, in the present example, lies in the range between 50–100 kHz. The parallel capacitor 12 serves the purpose of achieving a continuously flowing input current despite the pulsing of the network current with the switching frequency of the second alternating current switch 32.

The synchronization of the drive signals for the semiconductor switches 18 and 20 with the network frequency $f_{network}$ is of major significance. Short-circuit paths arise given overlap of the drive signals or a phase shift relative to the network frequency $f_{network}$. Given delayed activation of the unbiased paths or network outages (worst case in the voltage maximum), the coil 14 cannot demagnetize in a controlled fashion and undefined voltage spikes would arise.

The regulating unit 34 acquires the voltage $U_{load}$ at the load, compares the value to the reference $U_{load,ref.}$ and sets a corresponding pulse-duty ratio τ for the second alternating current switch 32 in conformity with the difference. In order to produce a current monitoring that intervenes into the regulation as needed, the current-proportional voltage is acquired at the shunt 40 and supplied to the regulation unit 34. The reference point (ground) of the current acquisition part lies at the source 42 of the second alternating current switch 32.

As noted above, MOSFETs can serve as semiconductor switches 18, 20, 33, 35, however, any other type of transistor such as, for example, bipolar transistors or IGBT, etc. can alternatively be employed.

Figure 6:
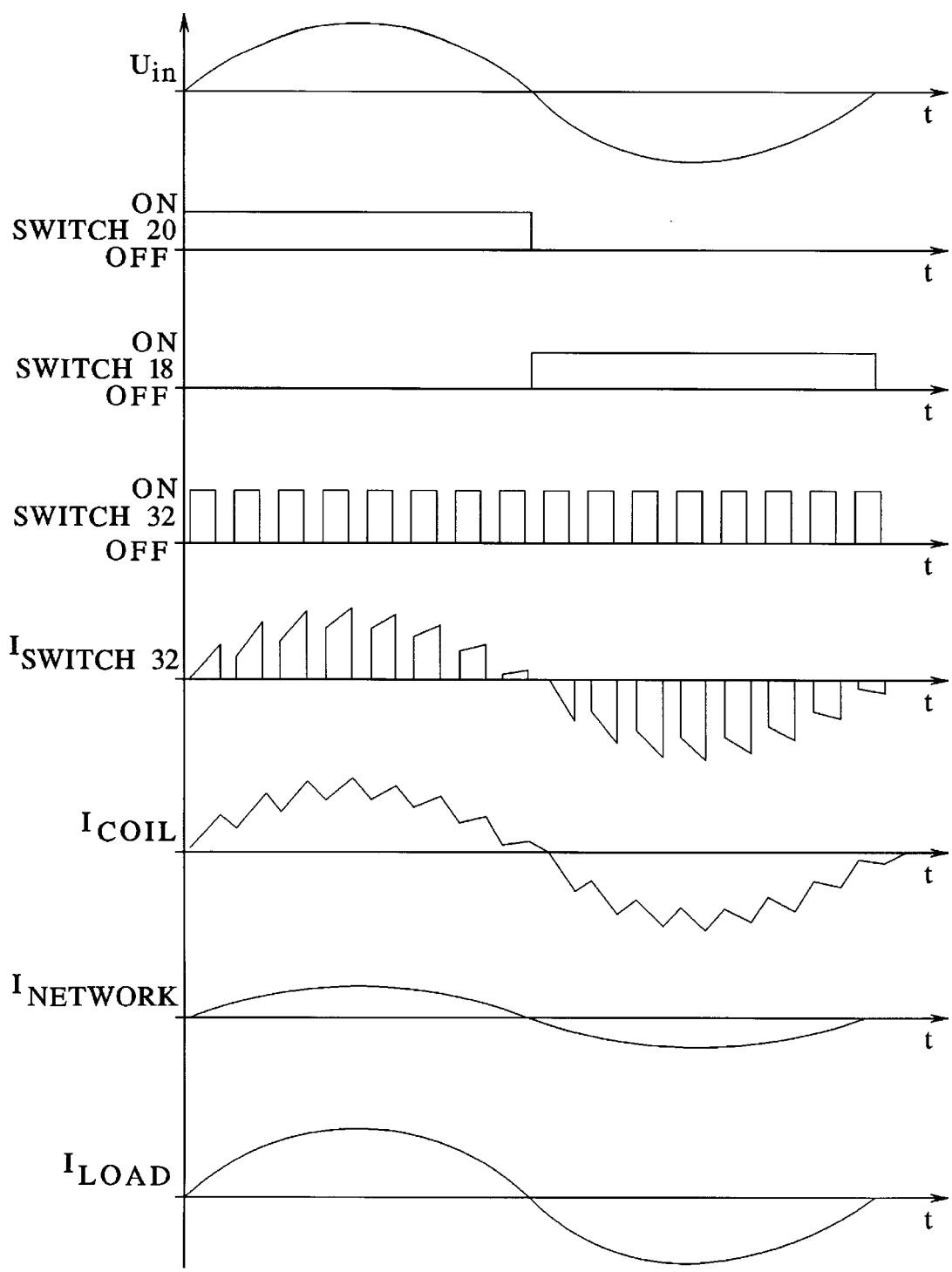
FIG. 6 shows drive signals and signal curves during operation of the circuit shown in FIG. 5.

In FIG. 6, the drive signals for the semiconductor switches 18, 20 and the second alternating current switch 32 as well as the appertaining currents dependent on the time t are compared to the time curve of the input voltage $U_{in}$. The switching frequency for the second alternating current switch 32 is intentionally selected very small in order to be able to illustrate the signal curves better. The drive signals exhibit a stationary operating point wherein $0<U_{load}<U_{in}$ applies. The second alternative current switch 32 is driven with a fixed switching frequency (switch statuses ON, OFF). Corresponding to the input alternating voltage $U_{in}$ and the switching frequency, a pulse-shaped current $I_{switch}$ 32 that follows the sinusoidal form of the input alternating voltage $U_{in}$ flows via the second alternating current switch 32. The current $I_{coil}$ in the coil 14, by contrast, proceeds Δ-shaped caused by the magnetization and demagnetization, underpinned by the sinusoidal curve of the input alternating voltage $U_{in}$. The current through the coil 14 is mirrored at the load with ohmic characteristic as the voltage $U_{load}$ without further deformation. This means that a sinusoidal voltage is also available to the load 10. The residual ripple in the coil current $I_{coil}$ which is superimposed on the sinusoidal curve becomes smaller and the sinusoidal form is achieved extremely well with increasing switching frequency of the second alternating current switch 32. Both currents, and thus the voltages as well, achieve a sinusoidal curve by additional filtering of the input and output currents (see low-pass filters 12 and 13 in FIG. 9).

The alternating current $U_{load}$ across the load 10 can be directly proportionally set via the pulse-duty ratio τ of the second alternating current switch 32. Current thereby continuously flows. Given a load having ohmic characteristic, the sinusoidal input alternating voltage $U_{in}$ is in turn sinusoidally mirrored at the load with the same frequency without phase shift or additional non-linear distortions (power factor=1; cos φ=1). This means that the demand for a continuous, sinusoidal current without phase shift and distortions is met by the inventive circuit. The inventive circuit contains only very few components in the path that carries the load current (coil 14 and second alternating current switch 32, or first alternating current switch 16). An extremely high efficiency is therefore also achieved with this circuit (up to 98%). The energy supplied to the load 10 can be externally varied between 0 and 100% nearly loss-free.

Figure 7:
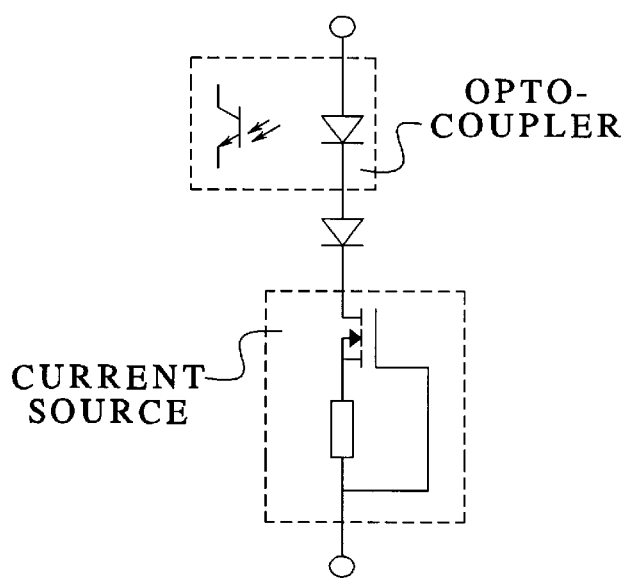
FIG. 7 shows a possible current source opto-coupler combination suitable for use in the inventive circuit.

FIG. 7 shows an embodiment of a current source/opto-coupler combination of the inventive circuit. A drive opto-coupler 44 (or 46) serves the purpose of coupling the drive signal of the drive and synchronization unit 26 (see FIG. 5). The necessary drive voltage is generated via a current source 48 (or 50). The existing differences in potential can be very simply bridged with the drive opto-coupler 44 (or 46). The current source 48 (or 50) already carries the required current for the drive opto-coupler 44 (or 46) briefly after the network zero-axis crossing and thus make an extremely exact and fast recognition of the network current 0-axis crossing possible. At the output side, the drive opto-coupler 44 (or 46) controls the first alternating current switch either directly or indirectly via suitable driver or transfer (transformer, repeater) units. The current source/opto-coupler combination or combinations is or are directly connected to the input voltage. When depletion mode MOSFETs are employed, the advantages are especially significant. Depletion mode transistors have a passively conducting channel, as a result of which the current necessary for the drive opto-couplers 44, 46 can already flow given an extremely minimum voltage. The network current zero-axis crossing, or the network voltage polarity is thus extremely exactly acquired. The component outlay for generating the switching signals is reduced, given employment of depletion mode transistors, to the transistor with a resistor in combination as current source, a protective diode against opposite polarity voltages and the drive/opto-coupler for the transmission of the signals. This solution is thus extremely exact, extremely inexpensive due to the low outlay for components and printed circuit board area, insensitive to disturbances due to its compact structure, needs no additional logic for the evaluation, requires no auxiliary voltage whatsoever and uses only extremely little energy. Due to the extremely exact recognition of the network polarity, whereby the circuit works to a network voltage of approximately two volts, another particular advantage is achieved. Given outage of the network voltage in the voltage maximum, excessive, undefined induction voltages would arise at the coil when the unbiased branches shut off too early and lock the unbiased path. The semiconductor switches would be extremely jeopardized as a result. Since, however, the current source/opto-coupler combinations operate reliably down to a voltage of only approximately two volts, the unbiased branches are sure to remain conductive in any case and assure a reliable demagnetization of the coil even given sudden voltage outages. A protective wiring of the coil with varistors, capacitors, or the like is thus not necessary. The entire circuit for generating the switching signals is reduced to a two-pole arrangement that is simple to manipulate. Alternatively, however, the synchronization signals can be transmitted with repeaters or integrated circuits that allow corresponding differences in potential. Other methods are also conceivable for the generation and transmission of these synchronizing signals.

Figure 8:
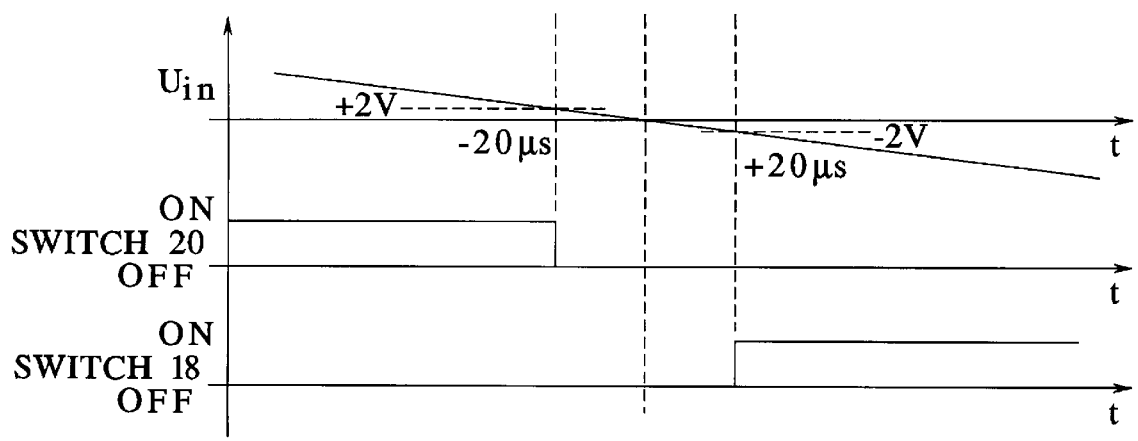
FIG. 8 shows drive signals for the network synchronization in the region of the network zero-axis crossing for the circuit shown in FIG. 7.

A current source 48, 50 that drives the respective drive/opto-couplers 44, 46 of the corresponding unbiased path is thus available for at least one network half-wave. These current source/opto-coupler combinations are directly arranged at the network voltage. In order to find the zero-axis crossing of the network voltage as exactly as possible as the switching point for the unbiased paths, and to achieve only a minimum dead time between the two control signals for the direct current switches 18, 20, current sources 48, 50 are utilized that already carry the current necessary for the drive opto-couplers 44, 46 given an extremely low network voltage i.e. shortly after the zero-axis crossing of the voltage. Excellent values can be achieved with the current sources 48 (negative network half-wave) and 50 (positive network half-wave) that respectively include a depletion mode MOSFET. Since the depletion mode transistor has a passively conducting channel, the threshold voltage of the drive opto-coupler diode and of the protective diode 42 or 43 suffices in order to activate the control. With this arrangement, the dead time in the voltage zero-axis crossing amounts to only approximately ±20 µs (see FIGS. 7 and 8) given a 230 volt rms/50 Hz network. This means that the two unbiased paths are switched given a momentary voltage of only two volts. With such low voltage values, the energy in the coil 14 remains so slight that there is no danger for the circuit. The key function of the circuit is ideally resolved with this configuration of the drive arrangement.

Figure 9:
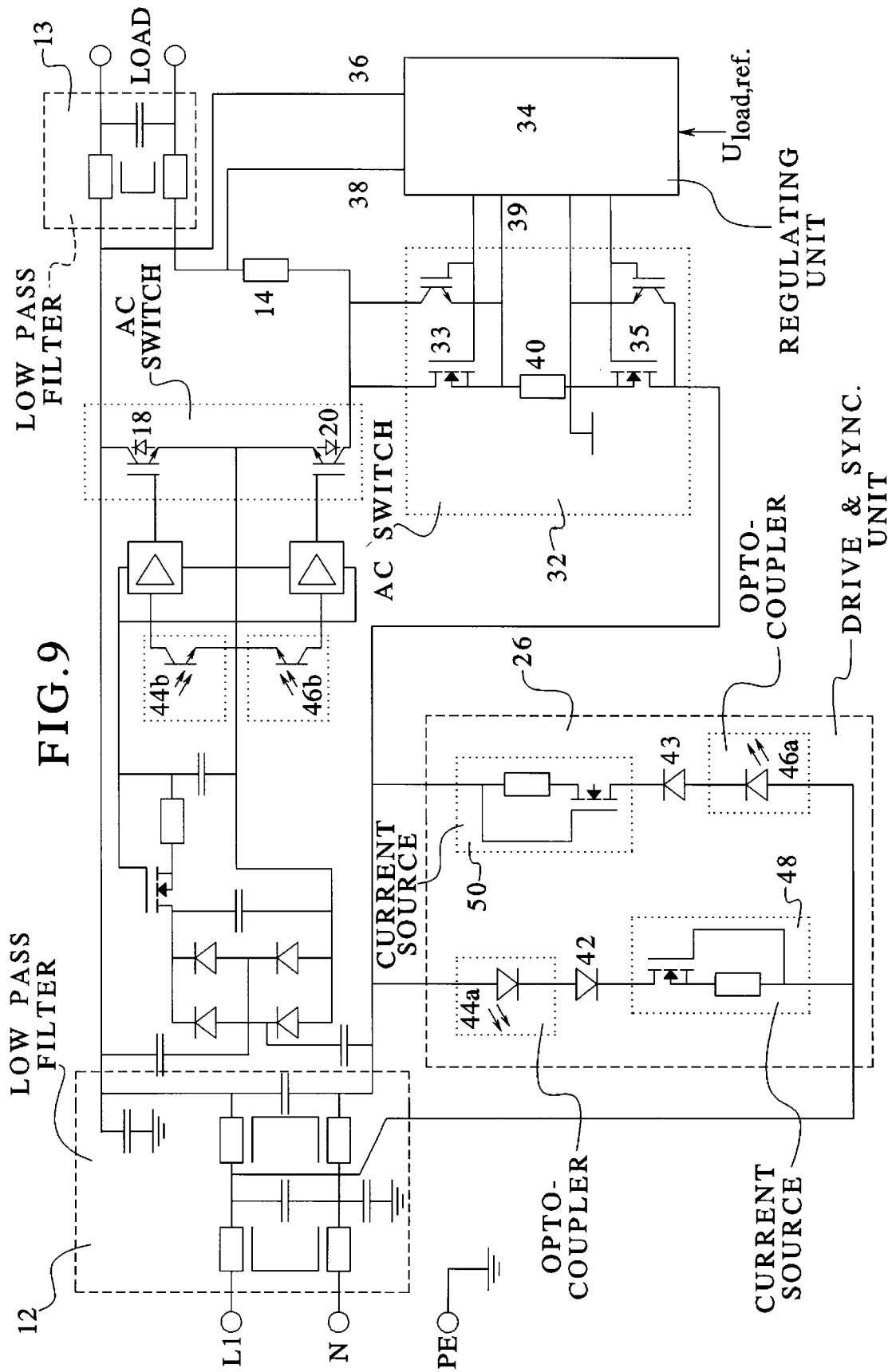
FIG. 9 is a circuit schematic of a part of a modified version of the circuit shown in FIG. 5.

FIG. 9 shows a more specific and partially modified example of the circuit shown in FIG. 5. The more specific nature thereof refers to the drive and synchronization unit (network synchronization). The second alternating current switch 32 shown in FIG. 9 has two semiconductor switches 33, 35 in the form of two MOSFETs connected oppositely in series. Further transistors (IGBTs in the example) can optionally be connected parallel in order to achieve higher powers. The transistors are connected directly parallel at the gate via drop resistors and are all operated with the same drive signal.

The allowable direction of current is switched in the first alternating current switch 16 according to the polarity of the input voltage. The semiconductor switch 20 is switched on during the positive network half-wave and the semiconductor switch 18 conducts the unbiased current via the integrated inverse diode. The semiconductor switch 18 remains switched on during the negative network half-wave (semiconductor switch 20 switched off), and the semiconductor switch 20 conducts the unbiased current via the inverse diode. The drive signals arrive via the current source/opto-coupler combination 26 and are transmitted to the semiconductor switches 18, 20 by the opto-couplers 44, 46 and the following drivers (transistors or integrated drivers or the like). The necessary auxiliary voltage is generated by a rectifier connected to the network via capacitors and having a following current source.

For regulating the voltage $U_{load}$ across the load, the actual voltage $U_{load,actual}$ at the user is proportionally acquired with a differential amplifier and suitably edited. A following regulator compares the actual voltage value $U_{load,actual}$ to the required reference value $U_{load,ref.}$ and forwards the deviation to a switched regulator. For limiting the current, the voltage at the shunt resistor 40 is acquired, edited and proportionally forwarded to the switched regulator. When a specific threshold is upwardly exceeded, the switched regulator reduces the pulse-duty ratio. In the present exemplary embodiment, a low-pass filters 12 and 13 are provided respectively at the input and the output. The low-pass filters 12 and 13 at the input and output are implemented in a more complicated fashion in this example than in FIG. 5 wherein only a capacitor is shown. Other versions of the embodiments of the low-pass filters 12 and 13 are also conceivable.

Figure 10:
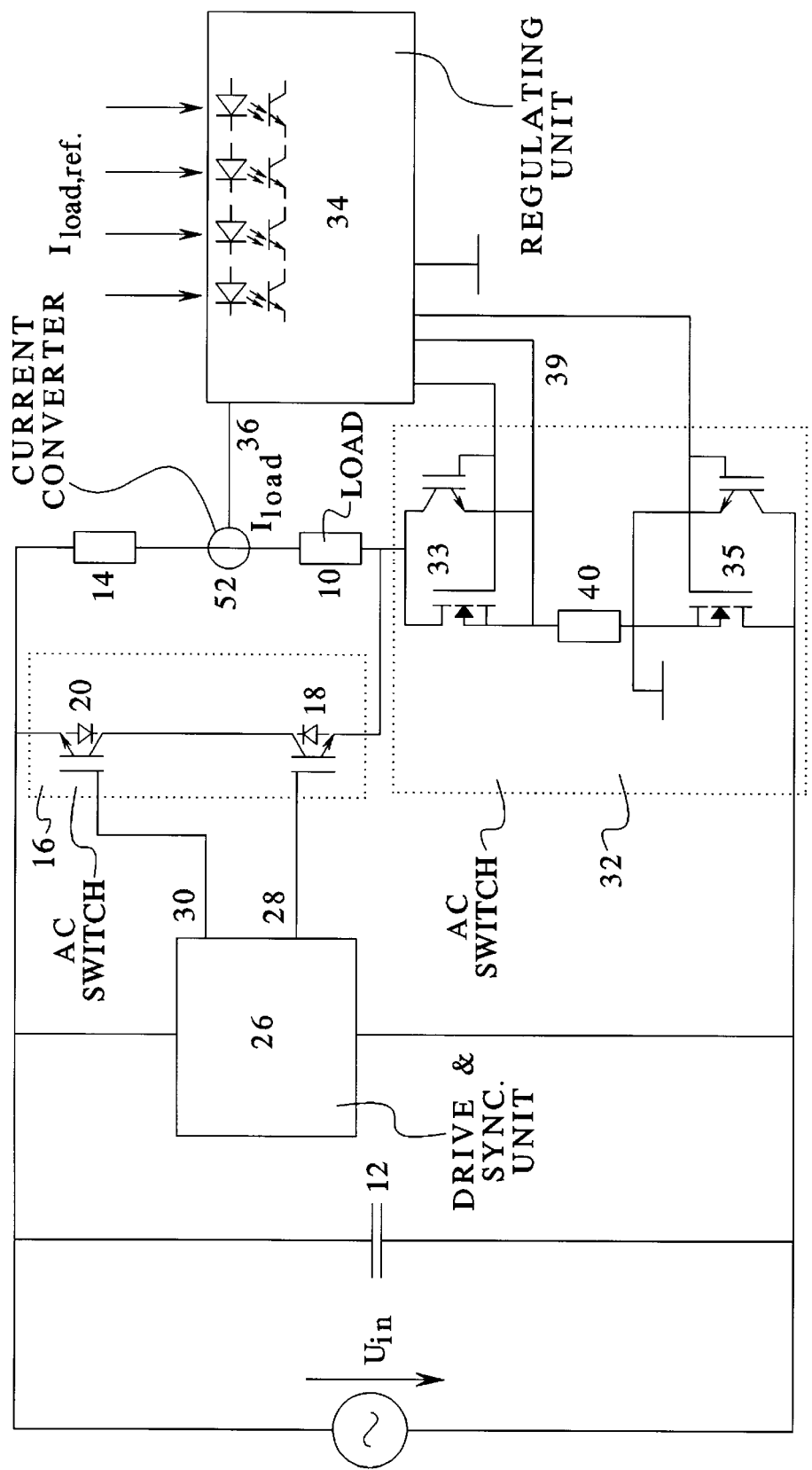
FIG. 10 is a circuit schematic of an embodiment of the inventive circuit that has a current regulator and first and second alternating current switches as well as the circuit of FIG. 9.

FIG. 10 schematically shows a further embodiment of the inventive circuit that has a regulating unit 34 for the current at a first alternating current switch 16 having two semiconductor switches 18, 20 in the form of two series-connected IGBTs having their collector electrodes connected in common. In this example, the reference value for the output current is transmitted potential-separated via opto-couplers. A current regulation can, particulary given highly non-linear load types, offer clear advantages over a voltage regulation since the currents are of critical significance for adhering to the standards EN61000-3-2, EN61000-3-3 and EN61000-3-4. Essentially, only the differences compared to the embodiments shown in FIGS. 5 and 9 shall be discussed below. In this embodiment, it is not the reference value of the voltage $U_{load,rated}$ across a load 10 but the reference value for the current $U_{load,ref}$ flowing through the use 10 that is prescribed via an input part of the regulating unit 34. The actual direct and/or alternating current value of the current I $U_{load,actual}$ flowing through the load 10 is acquired via a line 36 and a suitable current transformer 52. A drive part of the regulating unit 34 then controls the second alternating current switch 32 with a pulse-duty ratio τ suitable for generating the reference current given a constant switching frequency. The acquisition of current with a shunt 40 can also be employed to limit peak current and for short-circuit protection.

Figure 11:
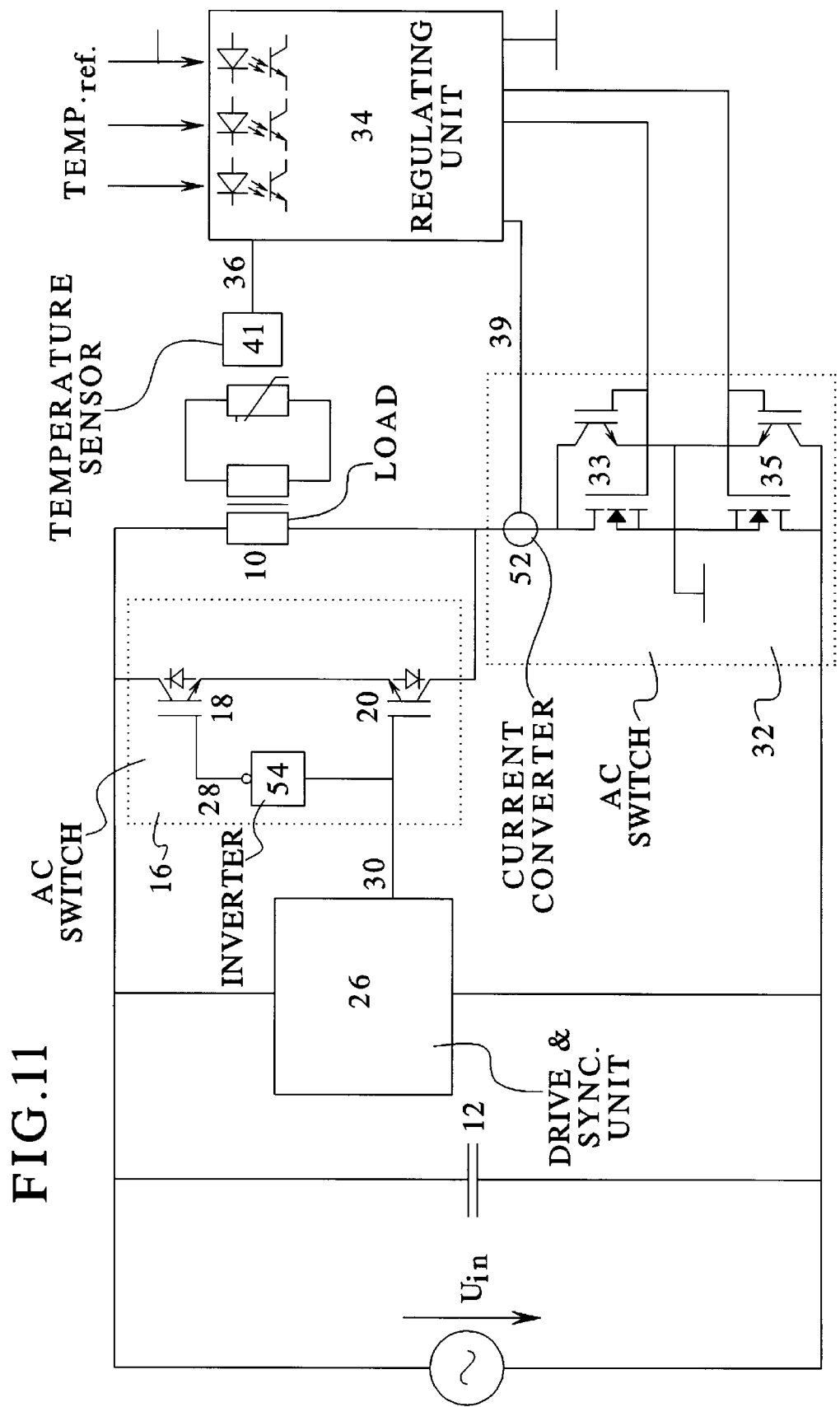
FIG. 11 is a circuit schematic, of a modified version of the embodiment of FIG. 10, that only contains a drive line for the network-synchronous drive of the first alternating current switch.

FIG. 11 shows a modification of FIG. 10 wherein the semiconductor switches 18 and 20 of the first alternating current switch 16 are driven via a single drive signal 30 of the drive and synchronization unit 26, which directly drives the semiconductor switch 20 via a control line 30 via a current source/opto-coupler combination and drives the semiconductor switch 18 inversely relative to the semiconductor switch 20 via an inverter and a drive line 28. A second current source/opto-coupler combination is saved and a second drive signal generation is not needed due to this type of drive. In detail, the circuit is as follows. The first alternating current switch 16 is formed by two semiconductor switches 18, 20 in the form of two IGBTs, each with an inverse diode, connected to one another via their emitters, so that a common control ground is present. The drive and synchronization unit 26 has only one current source/opto-coupler combination and only one control line 30 to the first alternating current switch 16. The other control line 28 is generated with an inverter 54 (transistor, operational amplifier or integrated inverter). The second alternating current switch 32 is composed of two MOSFETs in series with common source potential, to each of which an IGBT is connected in parallel, this leading to an increase in power. The current to the second alternating current switch 32 is acquired with a current converter 52 and is supplied to the regulating unit 34 via the line 39. A limitation of current and short-circuit protection are achieved as a result. The load 10 is a transformer (and therefore no separate conductance is needed) that supplies a non-linear heating resistor. The temperature of this heating element is supplied to the regulating unit 34 via a temperature sensor 41 and the line 36. As a reference value, the regulating unit 34 receives the reference temperature value via an isolated potential and sets the pulse-duty ratio at the second alternating current switch 32 in conformity with the deviation between the actual value and the reference value. Other quantities are acquired for, or are prescribed to, the regulating unit 34 as a reference value given different load types. Given, for example, a motor, the speed or the torque would be acquired or prescribed as rated value. The required quantities are supplied to the control unit 34, or are prescribed as a reference value in conformity with the load.

Figure 12:
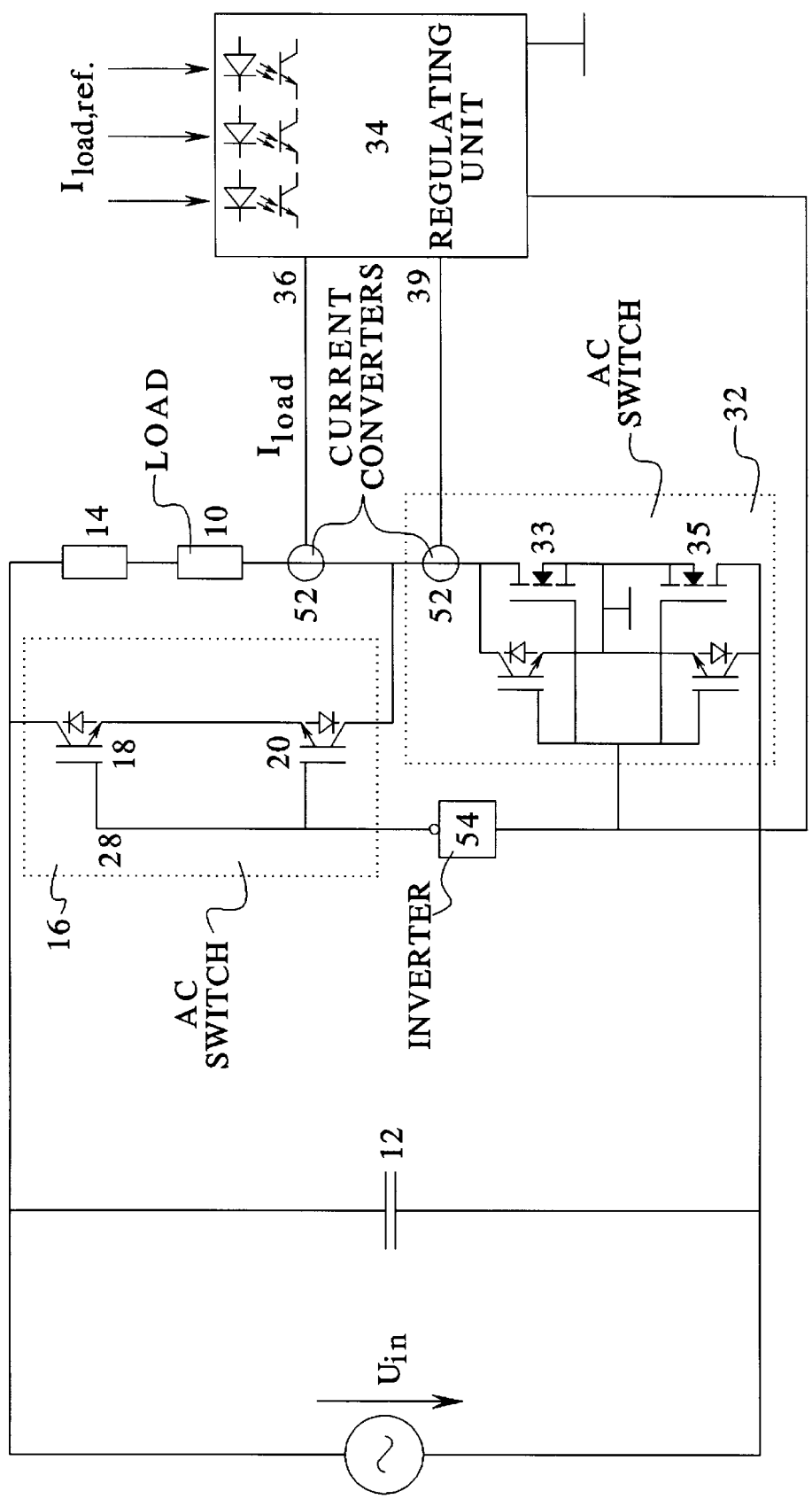
FIG. 12 is a circuit schematic of an embodiment of the inventive circuit that has a current regulator and first and second alternating current switches that are driven inversely relative to one another and network-asynchronously.

FIG. 12 schematically shows a further embodiment of the inventive circuit that has a current regulator and first and second alternating current switches that are driven inversely relative to one another, and network-asynchronously. The first alternating current switch 16 is fashioned like the first alternating current switch 16 in FIG. 11. The second alternating switch 32 in turn is formed by two semiconductor switches 33 and 35, and a current converter as overload protection. The first and second alternating current switches 16 and 32 are driven inversely relative to one another and network-asynchronously via an inverter 54.

Figure 13:
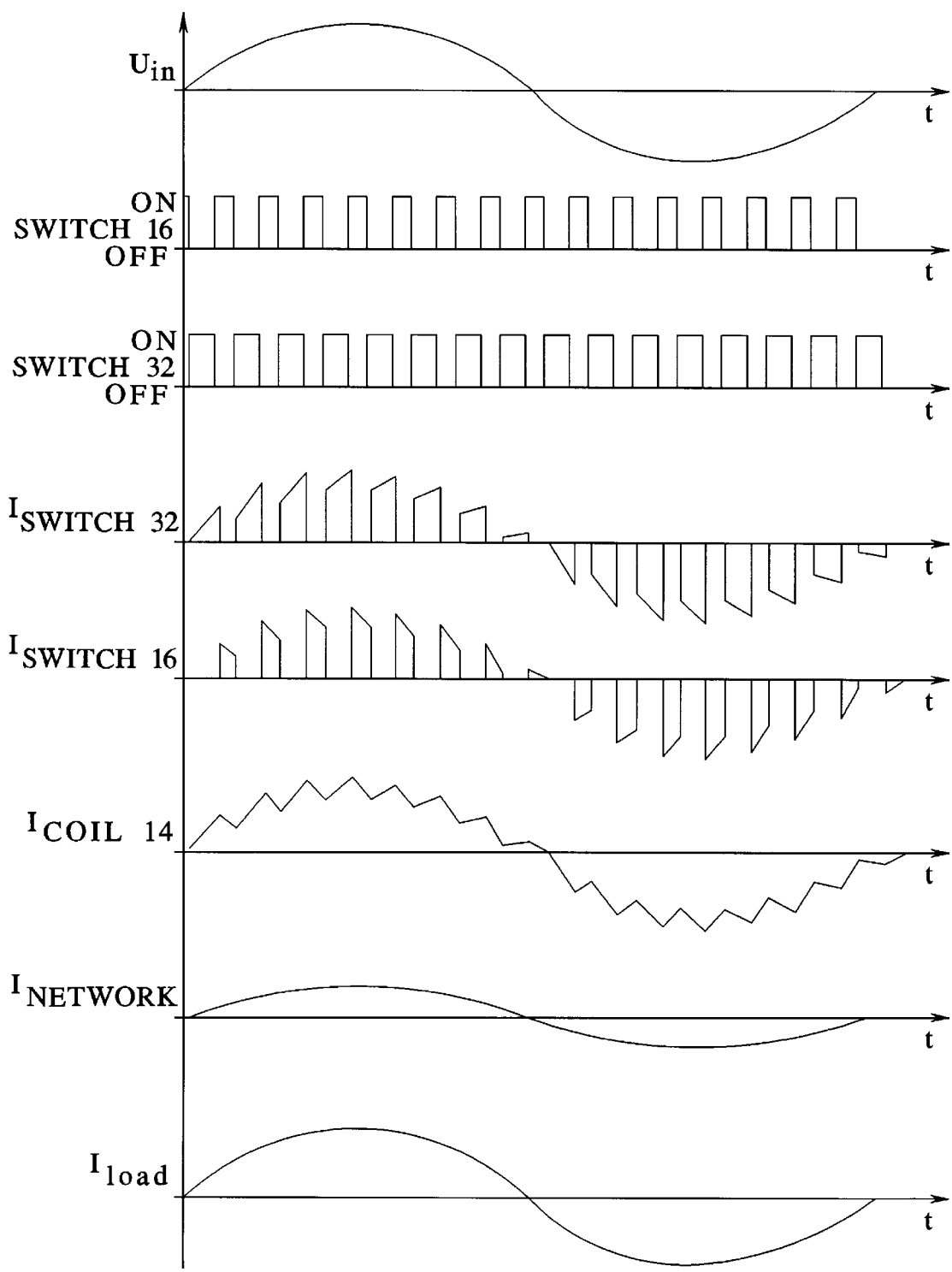
FIG. 13 shows drive signals and current and voltage curves during operation of the circuit shown in FIG. 12.

FIG. 13 shows the drive signals and current and voltage curves in a specific operating form of the circuit shown in FIG. 12. A network synchronization is superfluous. The first alternating current switch 16 remains turned off while the second alternating switch 32 is turned on (magnetization of the coil 14) so that a short-circuit path is not formed. When the second alternating current switch 32 is turned off, the first alternating current switch 16 must be turned on in order to assure the demagnetization of the coil 14 for both directions of the current. The two first and second alternating current switches 16 and 32 are thus turned off or on inversely relative to one another.

The inventive circuit meets the demands of the above-explained standards EN61000-3-2, EN61000-3-3 and EN61000-3-4, and exhibits minimum losses, a maximum efficiency, no wattless current, no phase drift, no non-linearity, continuous flow of current without periodic or aperiodic interruptions in all load points and a range of control from 0 through 100% of the input voltage $U_{in}$. When a switch is made between two operating points, for example by a skip function, then a matching of the prescription of the reference voltage value to the load type employed (for example, trapezoidal reference value prescription) is meaningful. Given a digital prescription of the reference value by a microprocessor, such load-typical data can be identified once and stored, for example, in ROM memories dependent on the configuration of the final employment. It is thus important to find out with which maximum switching dynamics (change rate of reference values) the load can be operated so that conformity with the standard EN61000-3-3is maintained. Adherence to this standard is no longer defined by the circuit (preceding converter) but is now made solely dependent the type of load employed, which must be known. When the data that describe the theoretically maximum reference value dynamics have been found, the load can be ideally operated with this limit dynamics.

The form, amplitude and frequency of the network voltage can be arbitrary. The inventive circuit is preferably operated at the internationally standard direct and/or alternating current voltage networks, namely, for example, with $f_{network} \geq 0$ Hz and with sinusoidal current and voltage curve.

Although modifications and changes may be suggested by those skilled in the art, it is the intention of the inventors to embody within the patent warranted hereon all changes and modifications as reasonably and properly come within the scope of their contribution to the art.

We claim as our invention:

1. A circuit for continuously directly or indirectly varying a combination of direct and alternating current flowing through a load supplied with a combination of direct and alternating voltage from a public utility mains, said circuit being used with a network which makes an input voltage $U_{in}$ available with a frequency $f_{network}$, and said load being connected to said network via said circuit, said circuit comprising:

a low-pass filter which produces a continuously flowing input current $I_{in}$;

a coil associated with said load;

a first alternating switch connected in parallel with said load and with said coil;

a second alternating current switch connected in series with said load;

means for driving said second alternating current switch with a switching frequency which is higher than said network frequency $f_{network}$; and regulating means for directly or indirectly regulating a current $I_{load}$ flowing through said load, said regulating means including an acquisition part for acquiring an actual current $I_{load}$, actual flowing through said load, a reference value input part for receiving a reference value current $I_{load,ref}$ for the current $I_{load,actual}$ flowing through the load, and a control part connected to said second alternating current switch for switching said second alternating current switch on and off with a switching frequency which is higher than said network frequency $f_{network}$, and with a pulse-duty ratio, for maintaining said current $I_{load,actual}$ substantially equal to said reference current $I_{load,ref}$.

2. A circuit as claimed in claim 1 wherein at least one of said first alternating current switch and said second alternating current switch comprises:

a first series combination comprising a first semiconductor switch connected in series with a first diode;

a second series combination comprising a second semiconductor switch connected in series with a second diode; and said first and second series combinations being respectively connected in parallel, with opposite polarity, across said load and said coil.

3. A circuit as claimed in claim 2 wherein each of said first semiconductor switch and second semiconductor switch comprises a semiconductor switch selected from the group consisting of a MOSFET, a bipolar transistor, an IGBT, a GTO, and MCT, a thyristor and triac.

4. A circuit as claimed in claim 1 wherein at least one of said first alternating current switch and said second alternating current switch comprises:

a first semiconductor switch having a block diode integrated therein;

a second semiconductor switch having a blocking diode integrated therein; and said first and second semiconductor switches being connected in series with opposite polarity.

5. A circuit as claimed in claim 4 wherein said first semiconductor switch and second semiconductor switch comprise a semiconductor switch selected from the group consisting of a MOSFET, a bipolar transistor, an IGBT, a GTO, and MCT, a thyristor and triac.

6. A circuit as claimed in claim 1 wherein at least one of said first alternating current switch and said second alternating current switch comprises:

a first semiconductor switch connected in parallel with a first blocking element;

a second semiconductor switch connected in parallel with a second blocking element; and said first and second semiconductor switches being connected in series.

7. A circuit as claimed in claim 6 wherein said first semiconductor switch and second semiconductor switch comprise a semiconductor switch selected from the group consisting of a MOSFET, a bipolar transistor, an IGBT, a GTO, and MCT, a thyristor and triac.

8. A circuit as claimed in claim 6 wherein said first blocking element and said second blocking element comprise a component selected from the group consisting of a blocking diode and a semiconductor component operable as a diode.

9. A circuit as claimed in claim 1 wherein said input voltage $U_{in}$ has a polarity and exhibits 0-axis crossings, and said circuit further comprising drive and synchronization means for driving and switching a direction of current through said first alternating current switch synchronously with at least one of the polarity and the 0-axis crossings of said input voltage $U_{in}$, said drive and synchronization means being connected in parallel to said input voltage $U_{in}$ at said network for acquiring the polarity of the input voltage $U_{in}$.

10. A circuit as claimed in claim 9 wherein said drive and synchronization means comprises an opto-coupler connected to said first alternating current switch and a current source which drives said opto-coupler to in turn drive said first alternating current switch.

11. A circuit as claimed in claim 10 wherein said current source comprises a component selected from the group consisting of a depletion mode MOSFET, an enhancement mode MOSFET, a bipolar transistor and an IGBT.

12. A circuit as claimed in claim 10 wherein said opto-coupler, at an output side thereof, directly drives said first alternating current switch.

13. A circuit as claimed in claim 10 wherein said opto-coupler, at an output side thereof, indirectly drives said first alternating current switch via a component selected from the group consisting of a driver and an inverter stage.

14. A circuit as claimed in claim 1 comprising means for driving said first alternating current switch and said second alternating current switch inversely relative to each other and network-asynchronously.

15. A circuit as claimed in claim 1 wherein said low-pass filter is connected across $U_{in}$, and further comprising a further low-pass filter connected at an output of said circuit.

16. A circuit as claimed in claim 15 wherein at least one of said low-pass filter and said further low-pass filter comprises at least one capacitor connected in parallel with said network.

17. A circuit as claimed in claim 16 wherein said capacitor comprises an X-capacitor.

18. A circuit as claimed in claim 16 wherein said capacitor comprises a Y-capacitor.

19. A circuit as claimed in claim 15 wherein at least one of said low-pass filter and said further low-pass filter comprises a combination of at least one coil and at least one capacitor.

20. A circuit as claimed in claim 19 wherein said coil comprises a current compensated coil.

21. A circuit as claimed in claim 19 wherein said coil comprises a non-current compensated coil.

22. A circuit as claimed in claim 19 wherein said capacitor comprises an X-capacitor.

23. A circuit as claimed in claim 19 wherein said capacitor comprises a Y-capacitor.

24. A circuit as claimed in claim 19 wherein said combination comprises a multi-stage combination.

25. A circuit as claimed in claim 1 wherein each of said first alternating current switch and said second alternating current switch contains a semiconductor component, the respective semiconductor components of said first and second alternating current switches being connected for sharing a reference potential for driving said first and second alternating current switches.

26. A circuit as claimed in claim 1 further comprising a shunt connected between said regulating means and said second alternating current switch for supplying current to said second alternating current switch.

27. A circuit as claimed in claim 1 further comprising a current converter connected between said regulating means and said second alternating current switch for supplying current to said second alternating current switch.

28. A circuit as claimed in claim 1 wherein said means for driving said second alternating current switch comprises means for driving said second alternating current switch at a switching frequency in a range between 1 kHz through 500 kHz.

29. A circuit as claimed in claim 1 wherein said input part comprises an interface for programming said current $I_{load}$ flowing through said load and a voltage $U_{load}$ across said load in a range between 0% through 100% of respectively nominal values for $I_{load}$ and $U_{load}$.

30. A circuit as claimed in claim 29 wherein said interface comprises a potential-constrained interface.

31. A circuit as claimed in claim 29 wherein said interface comprises a potential-free interface.

32. A circuit as claimed in claim 1 wherein said load comprises a load selected from the group consisting of an ohmic load having a substantially linear behavior, an inductive load, a capacitive load, and a combination of an ohmic and inductive and capacitive load.

* * * * *